United States Patent
Beaumont et al.

(10) Patent No.: US 10,254,936 B2
(45) Date of Patent: Apr. 9, 2019

(54) DEVICES AND METHODS TO RECEIVE INPUT AT A FIRST DEVICE AND PRESENT OUTPUT IN RESPONSE ON A SECOND DEVICE DIFFERENT FROM THE FIRST DEVICE

(71) Applicant: Lenovo (Singapore) Pte. Ltd., Singapore (SG)

(72) Inventors: Suzanne Marion Beaumont, Wake Forest, NC (US); Russell Speight VanBlon, Raleigh, NC (US); Rod D. Waltermann, Rougemont, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/823,898

(22) Filed: Nov. 28, 2017

(65) Prior Publication Data
US 2018/0081523 A1 Mar. 22, 2018

Related U.S. Application Data

(63) Continuation of application No. 14/878,265, filed on Oct. 8, 2015, now Pat. No. 9,875,007, which is a continuation of application No. 14/095,093, filed on Dec. 3, 2013, now Pat. No. 9,213,659.

(51) Int. Cl.
| | |
|---|---|
| *G06F 3/00* | (2006.01) |
| *G06F 3/14* | (2006.01) |
| *G06F 3/0484* | (2013.01) |
| *G06F 13/36* | (2006.01) |
| *H04M 1/02* | (2006.01) |

(52) U.S. Cl.
CPC ............ *G06F 3/04842* (2013.01); *G06F 3/00* (2013.01); *G06F 13/36* (2013.01); *H04M 1/02* (2013.01); *G06F 3/1423* (2013.01)

(58) Field of Classification Search
None
See application file for complete search history.

(56) References Cited

U.S. PATENT DOCUMENTS

| | | | |
|---|---|---|---|
| 2,510,344 A | 6/1950 | Law | |
| 2,567,654 A | 9/1951 | Jan | |
| 3,418,426 A | 12/1968 | Herbert et al. | |
| 3,628,854 A | 12/1971 | Jampolsky | |
| 4,082,433 A | 4/1978 | Appeldorn et al. | |
| 4,190,330 A | 2/1980 | Berreman | |
| 4,577,928 A | 3/1986 | Brown | |
| 5,579,037 A | 11/1996 | Tahara et al. | |
| 5,583,702 A | 12/1996 | Cintra | |

(Continued)

FOREIGN PATENT DOCUMENTS

| | | |
|---|---|---|
| CN | 101825890 A | 9/2010 |
| CN | 202838006 U | 3/2013 |

(Continued)

*Primary Examiner* — Elias Mamo
(74) *Attorney, Agent, or Firm* — John L. Rogitz; John M. Rogitz

(57) ABSTRACT

An apparatus includes a processor and a memory accessible to the processor. The memory bears instructions executable by the processor to receive user input into the apparatus implicating an output in response, and present the response on a device separate and apart from the apparatus instead of presenting the response on the apparatus.

20 Claims, 6 Drawing Sheets

(56) References Cited

U.S. PATENT DOCUMENTS

| | | | |
|---|---|---|---|
| 6,046,847 A | 4/2000 | Takahashi | |
| 7,483,964 B1 | 1/2009 | Jackson et al. | |
| 9,213,659 B2 | 12/2015 | Beaumont et al. | |
| 2004/0160419 A1 | 8/2004 | Padgitt | |
| 2005/0120381 A1 | 6/2005 | Yamaguchi | |
| 2006/0178760 A1 | 8/2006 | Mann et al. | |
| 2006/0212719 A1* | 9/2006 | Miyawaki | G06F 3/061 713/189 |
| 2008/0284736 A1* | 11/2008 | Trent, Jr. | G06F 3/023 345/168 |
| 2009/0065578 A1* | 3/2009 | Peterson | G05B 19/048 235/382 |
| 2009/0204410 A1 | 8/2009 | Mozer et al. | |
| 2009/0259349 A1 | 10/2009 | Golenski | |
| 2009/0315740 A1 | 12/2009 | Hildreth et al. | |
| 2010/0079508 A1 | 4/2010 | Hodge et al. | |
| 2010/0161207 A1* | 6/2010 | Do | G01C 21/36 701/532 |
| 2010/0171720 A1 | 7/2010 | Craig et al. | |
| 2010/0211918 A1 | 8/2010 | Liang et al. | |
| 2011/0065451 A1 | 3/2011 | Danado et al. | |
| 2011/0131520 A1* | 6/2011 | Al-Shaykh | H04L 12/2807 715/772 |
| 2012/0149309 A1* | 6/2012 | Hubner | H04W 4/023 455/67.11 |
| 2012/0214506 A1* | 8/2012 | Skaaksrud | H04W 4/02 455/456.1 |
| 2012/0220311 A1 | 8/2012 | Rodriguez et al. | |
| 2012/0268268 A1 | 10/2012 | Bargero | |
| 2013/0021459 A1 | 1/2013 | Vasilieff et al. | |
| 2013/0044042 A1 | 2/2013 | Olsson et al. | |
| 2013/0170755 A1 | 7/2013 | Dalton et al. | |
| 2013/0246663 A1 | 9/2013 | Raveendran et al. | |
| 2013/0307771 A1 | 11/2013 | Parker et al. | |
| 2014/0317524 A1 | 10/2014 | VanBlon et al. | |
| 2016/0026370 A1 | 1/2016 | Beaumont et al. | |

FOREIGN PATENT DOCUMENTS

| | | |
|---|---|---|
| CN | 202975737 U | 6/2013 |
| CN | 103293968 A | 9/2013 |
| DE | 69937592 | 10/2008 |
| DE | 10310794 | 10/2012 |
| EP | 0880090 A2 | 11/1998 |
| WO | 2004051392 A2 | 6/2004 |

* cited by examiner

DEVICES AND METHODS TO RECEIVE INPUT AT A FIRST DEVICE AND PRESENT OUTPUT IN RESPONSE ON A SECOND DEVICE DIFFERENT FROM THE FIRST DEVICE

FIELD

The present application relates generally to receiving input at a first device and providing output at a second device.

BACKGROUND

Computing devices such as e.g. notebook computers and smart phones typically receive input such as a request from a user and provide output complying with the request on the same device. However, present principles recognize that the computing device receiving the input is not necessarily the most suitable device for providing the output, and e.g. may not even have the requisite functionality to fully comply with the request.

SUMMARY

Accordingly, in a first aspect an apparatus includes a processor and a memory accessible to the processor. The memory bears instructions executable by the processor to receive user input into the apparatus implicating an output in response, and present the response on a device separate and apart from the apparatus instead of presenting the response on the apparatus. The device is understood to not be an output device of the apparatus.

Thus, the apparatus may not be a smart phone, but the device may be a smart phone. The instructions may accordingly be further executable by the processor to automatically initiate a telephone call using the device without further command or input from the user responsive to a determination that the input to the apparatus is a command to make the telephone call.

Furthermore, in some embodiments the instructions may be further executable by the processor to determine a use context of the user input and, based at least in part on the use context, determine a device to which to deliver the response. Also, if desired, the instructions may be further executable by the processor to determine a location of the apparatus, determine that the device is at or near the location, and at least in part based on a determination that the device is at or near the location, determine to output the response on the device. The instructions may also be executable by the processor to present the response on the device based on input from a position sensor, a temperature sensor, a humidity sensor, an ambient light sensor, and/or a proximity sensor.

In addition to the foregoing, if desired the instructions may be further executable by the processor to determine to present the response on the device at least in part based on a determination that the device is a nearest device to the apparatus physically and/or on a list of devices. Also, if desired, the instructions may be further executable by the processor to determine to present the response on the device at least in part based on a determination that the user is looking at the device.

In another aspect, a method includes receiving, at an apparatus, user input demanding an output, and determining a device at which to present the output at least in part based on device capability and/or contextual inference and/or ephemeral information and/or content-based data.

In still another aspect, a first device includes a processor and a memory accessible to the processor. The memory bears instructions executable by the processor to receive user input and generate a signal representing an output in response, and at least in part based on a location of the first device and/or a context of the input, determine an identity of a second device different from the first device on which to present the output.

The details of present principles, both as to their structure and operation, can best be understood in reference to the accompanying drawings, in which like reference numerals refer to like parts, and in which:

DETAILED DESCRIPTION

Figure 1:
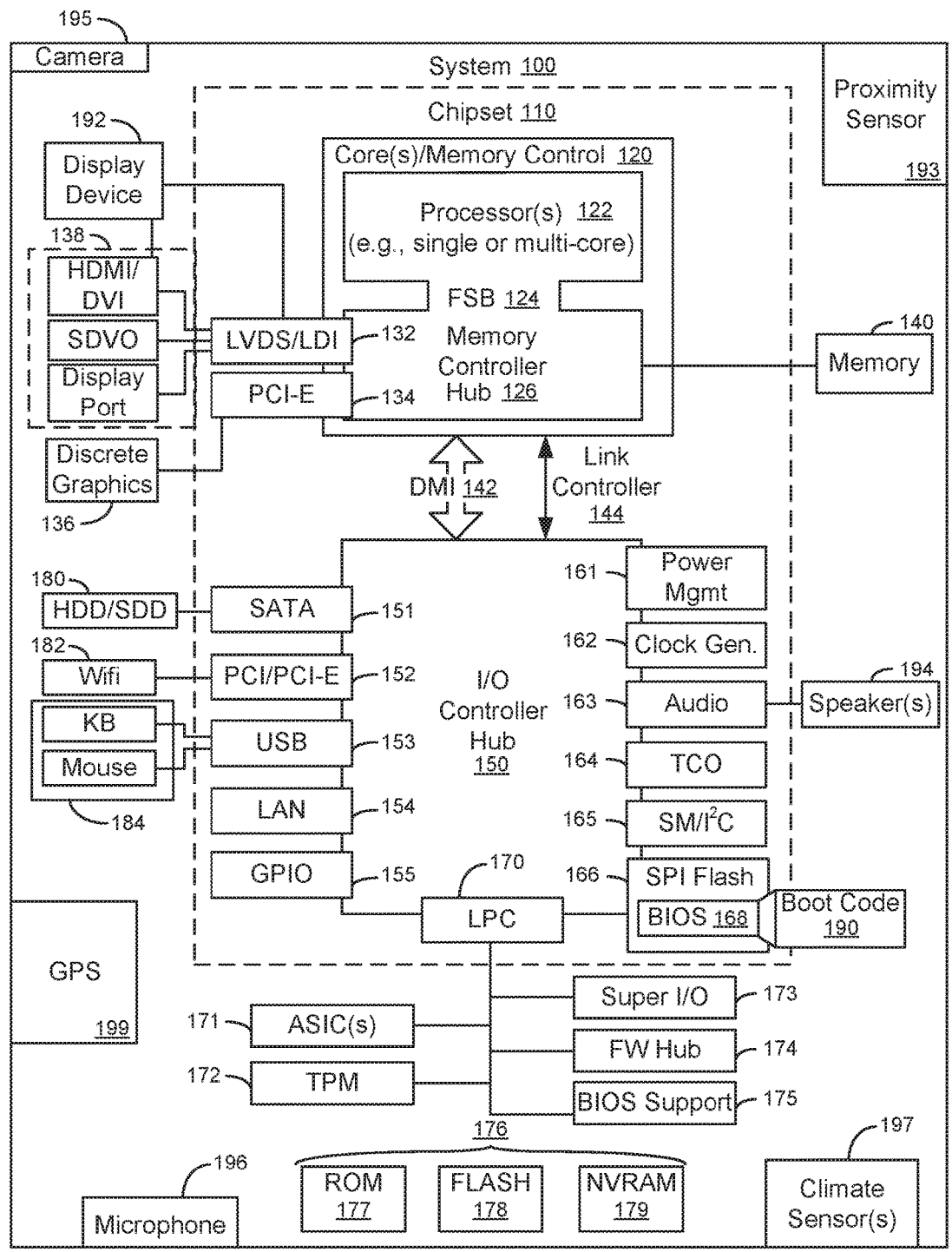
FIG. 1 is a block diagram of an exemplary device in accordance with present principles.

This disclosure relates generally to (e.g. consumer electronics (CE)) device based user information. With respect to any computer systems discussed herein, a system may include server and client components, connected over a network such that data may be exchanged between the client and server components. The client components may include one or more computing devices including televisions (e.g. smart TVs, Internet-enabled TVs), computers such as laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed, in addition to a general-purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now in reference to FIG. 1, it shows an exemplary block diagram of an exemplary computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, so-called "convertible" devices such as e.g. a tablet that may be converted to a laptop by virtue of being connected to a soft keyboard, and/or other smart devices, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case, the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 also may include sensors and/or a sensor array including e.g. a proximity, infrared, sonar, and/or heat sensor 193 providing input to the processor 122 and configured in accordance with present principles for sensing e.g. body heat of a person and/or the proximity of at least a portion of the person to at least a portion of the system 100 such as the sensor 193 itself. Also in some embodiments, the system 100 may include one or more cameras 195 providing input to the processor 122. The camera 195 may be, e.g., a thermal imaging camera, a digital camera such as a webcam, and/or a camera integrated into the system 100 and controllable by the processor 122 to gather pictures/images and/or video in accordance with present principles (e.g. to gather one or more images of eyes to apply eye tracking software to the image(s) as set forth below). Moreover, the system 100 may include an audio receiver/microphone (e.g. a microphone or microphone array) 196 for e.g. entering input such as a command to the system 100 in accordance with present principles.

In addition to the foregoing, the system 100 may include one or more climate sensors 197 (such as e.g., an (e.g. ambient) light sensor, a temperature sensor, a humidity sensor, and/or an environmental sensor) providing input to the processor 122 in accordance with present principles. The system 100 may also include one or more motion sensors 198 (such as e.g., an accelerometer and/or a gesture sensor (e.g. for sensing gestures in free space associated by the device with commands in accordance with present principles), etc.) providing input to the processor 122 in accordance with present principles. Though not shown, still other sensors may be included, and their output used in accordance with present principles, such as e.g. biometric sensors, sound sensors, orientation sensors, location sensors, scan sensors, and/or time sensors. Also note that a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
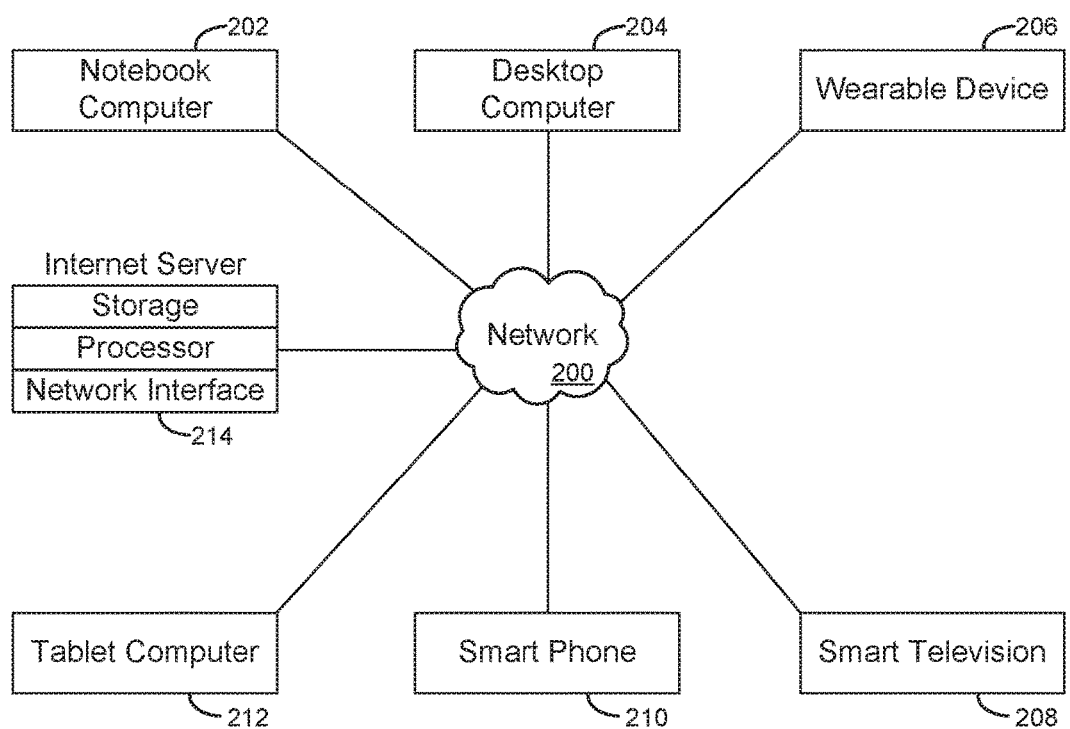
FIG. 2 is a block diagram of a network of devices in accordance with present principles.

Before moving on to FIG. 2 and as described herein, it is to be understood that an exemplary device or other machine/computer may include fewer or more features than shown on the system 100 of FIG. 1. In any case, it is to be understood at least based on the foregoing that the system 100 is configured to undertake present principles (e.g. receive input from a user, provide output based on the input, store and execute and/or undertake the logic described below, and/or perform any other functions and/or operations described herein).

Turning now to FIG. 2, it shows exemplary devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
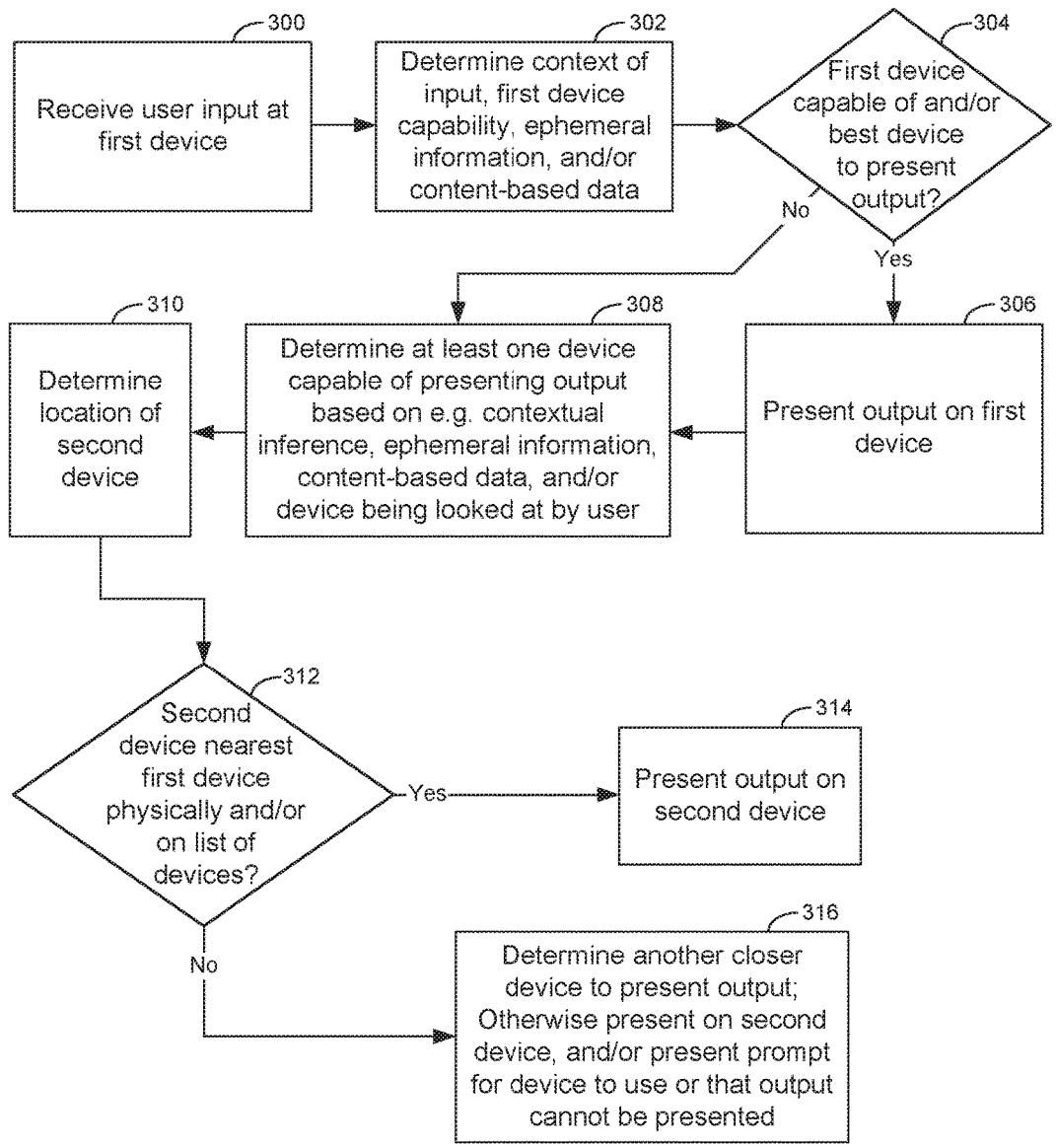
FIGS. 3 and 4 are example flowcharts of logic to be executed by a device in accordance with present principles.

Now in reference to FIG. 3, an example flowchart is shown of logic to be executed by a device such as the system 100 described above (e.g. such a device undertaking the logic of FIG. 3 referred to when describing FIG. 3 as "the device") in accordance with present principles. Beginning at block 300, the logic receives user input implicating an output in response to the input. For instance, the input may be an audible command for the device to output a function in response, selection of an icon to launch an associated application, providing a command for the device to initiate a telephone call and/or an email to be written, a command to present audio video (AV) content, etc. In any case, after block 300 the logic proceeds to block 302, where the logic determines one or more of the following: a use context of the user input, the one or more capabilities of the first device, ephemeral information, and/or content-based data.

First describing the use context of the user input, use context is understood to include e.g. contextual information associated with an output complying with the input. E.g., use context may implicate a particular function (e.g. for the device to output in response to the input) and/or function type. Use context and/or function type may be determined by comparing e.g. a received keyword provided in input (e.g. a command) to a data table of key words and respectively associated functions and/or function types associated with the key word to determine the use context based on matching the received keyword to a keyword in the table and hence accessing the function and/or function type in the table associated with the keyword in the table that has been matched.

Still other way ways of determining use context and/or function type in accordance with present principles may be used, such as using e.g. speech recognition and/or command recognition software, executing comparisons on data tables correlating types of input with function types/use context, etc. Moreover, use context may be determined in some example embodiments simply based on an application which is to be launched or otherwise employed responsive to input received at block 300 (e.g. input selecting an icon associated with an application) such that e.g. launching a media player application may cause the device to determine that the use context and/or function type is presenting media based on parsing programming code and/or settings for the media player application itself which pertains to presenting media and/or implicates presenting media.

As another example, should input be provided to the device as an audible command from a user to "please call Bill," the device may determine that the context is the function of placing a telephone call, and hence determine that an output function is to initiate a telephone call. Note that one-way use context may be determined in this non-limiting example is by e.g. comparing the received input to a lookup table of inputs and respective associated outputs for each input in the table such that the received input may be compared against the table to locate a match within the table of the received input with an input indicated in the data table, and hence locate the output function associated with the indicated input that matches the received input. Thus, the received keyword "call" may be compared against a lookup table of keywords to match the received keyword "call" with an input entry in the table "call," and hence the device may determine the function associated with the input entry for "call," which may be a function type of placing and/or initiating a telephone call.

In addition to or in lieu of the foregoing, use context may be determined based on the file selected. For instance, the device may have been programmed prior to receiving input at block 300 to, responsive to selection of a file of a particular file type, cause the device to automatically launch a function and/or application associated with the file type. Hence, when providing input in accordance with present principles e.g. at block 300, that input e.g. one way or another (e.g. directly requesting a particular file, executing a function on the file, etc.) may implicate a file type (e.g. providing input selecting a music file of the MP3 type) for a file associated with the input (e.g. being requested in the input), and accordingly implicate a function for files of the type, where such a function may be the use context or be associated with the use context.

Also in addition to or in lieu of the foregoing, determining another device on which to present an output based on context information may involve past device usage history and/or patterns, and/or past output viewing history and/or patterns. For instance, each time a particular type of output is presented on a particular device per e.g. user preference and/or user request, the instance may be noted in a log of output types and devices that have been used for the output type. Then, upon a subsequent determination of a device on which to present different output, the log may be accessed to determine, based on a current input having a particular context, which device(s) should present the output based on past device usage history/patterns and/or past output viewing history and/or patterns from the log for the same particular context. For instance, the device may access the log to determine which device has the most times had output of a particular type presented thereon, and the device may thus determine that output should be presented on that device should it be proximate to the input device, and if not proximate the device may determine yet another device on which output of the particular type has been presented the second-most times and, assuming it is proximate to the input device, cause the output to be presented thereon.

As another example, present principles may be applied to determining patterns for how a person prefers to work and/or is most productive to subsequently provide output to a device at which the user most frequently works (e.g. based on determining the actual number of minutes the user has "worked" at each device and selecting the device associated with the highest number of minutes worked and/or user engagement with a device when e.g. manipulating a word processing application).

Still in reference to block 302 of FIG. 3 but now describing device capability, the logic may determine the capability of the device to provide output (e.g. execute a function) complying with the received input. As an example, when the device undertaking the logic of FIG. 3 is a smart TV not equipped with telephone call-making functionality, but where input to place a telephone call was received at the TV, the logic may determine whether it has e.g. an application, software, or other functionality enabling it to comply with the request, and in the present exemplary instanced the logic when executed by a TV may determine it does not have the capability to place a telephone call based on e.g. not being connected to a telephone network and/or not having a telephone application or other means for placing a telephone call.

Figure 9:
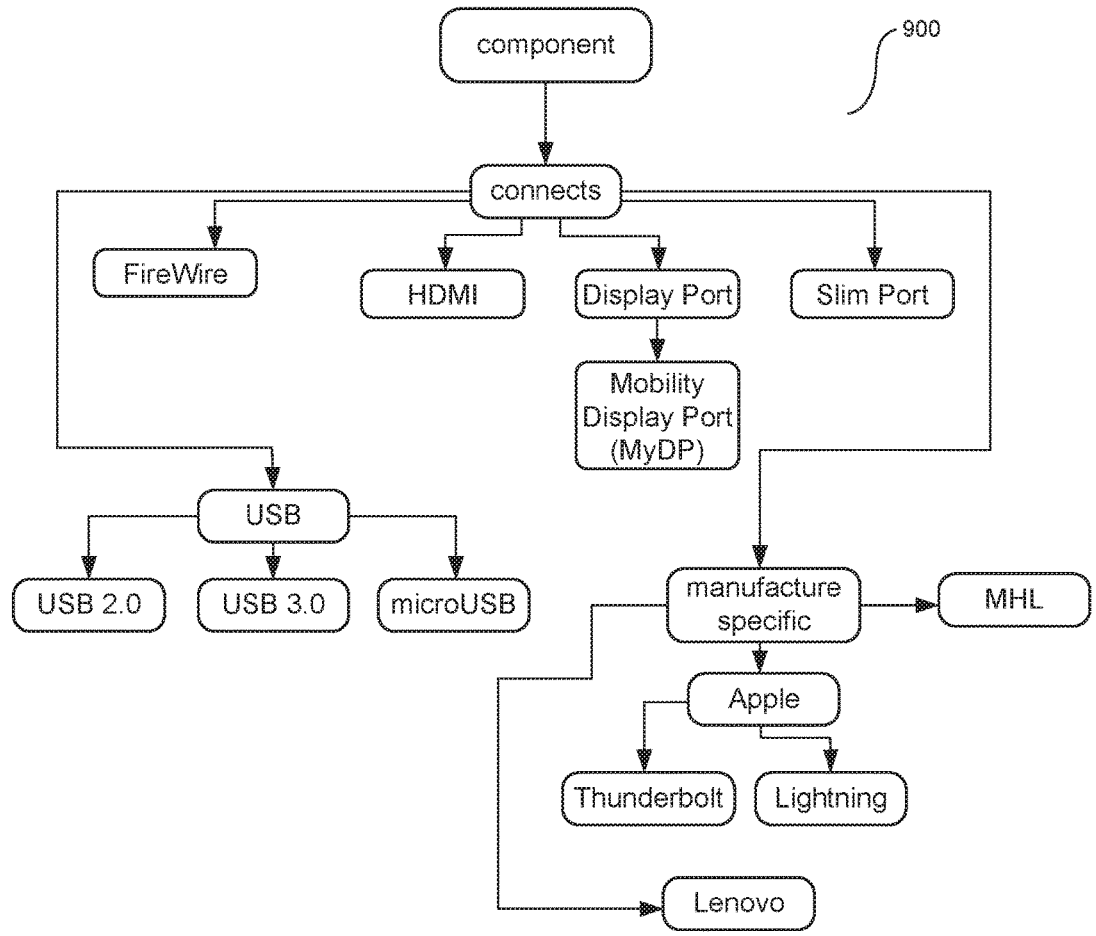
FIG. 9 is an exemplary system including components that may provide ephemeral information in accordance with present principles.

Determining ephemeral information as may be done at block 302 may include e.g. determining the time of day (e.g. by accessing a clock application), a location of the first device (e.g. using a GPS transceiver on the device), current climate conditions (e.g. temperature, humidity, and ambient light based on input form a climate sensor to determine a best device on which to present the output and/or that can present the output based on current climate conditions), currently available bandwidth for transferring data over a network to which the device is currently connected, currently available power from a power supply, current workload of a device (e.g. if the "better" HD TV were already in use, but a "lesser" nearby HD TV was idle, then the determination could be to present output on the "lesser" HD TV based on it having a lesser workload), etc. Examples of other components that may provide ephemeral information in accordance with present principles are shown as being included in a system 900 (e.g. that may be substantially similar in function and configuration to the system 100) as shown in FIG. 9.

Still in reference to block 302 of FIG. 3 but now describing determining content-based data, content-based data may include metadata associated with a piece of content that indicates e.g. a content type, content length or duration, content quality and/or resolution, etc. Content-based data may be determined by accessing such metadata, and/or may also be determined based on e.g. comparing a received input keyword to a data table of key words and respectively associated contents and/or content types to match the received input to a keyword associated with a content and/or content type from the table. In any case, content-based data may be used e.g. in conjunction with device capability as set forth above to determine e.g. whether the first device is capable of and/or the best available and/or proximate (e.g. within a threshold distance) device on which to present the output, as is done by the logic at decision diamond 304.

Thus, in accordance with present principles, the logic may determine that while e.g. the first device is capable of presenting high definition AV content, a device with a larger display screen (and/or a higher screen resolution and/or other device metrics) determined to be within a threshold distance of the first device based on e.g. a comparison of GPS coordinates from the larger display screen device to GPS coordinates of the first device (e.g. as received over a network to which both devices are connected may) is more suitable in at least one capacity, capability, functionality, etc. for presenting the HD content. This may be based on a weighting of factors such as e.g. display screen size of the device being assigned one weight and the display screen size of another device such as a high definition (HD) TV being assigned another weight different from the first weight. Assuming e.g. weights are assigned from low to high based on small to large screen sizes, and assuming e.g. a user has configured a setting for the device to e.g. always present content on a larger screen when it is available and/or proximate, the weights may be compared against each other by the logic and the higher weight selected, and hence the HD TV may be determined to be not only capable of presenting the output (e.g. based on the device pinging or otherwise accessing device capabilities for the HD TV such as e.g. by accessing a network list of devices on the network and capabilities associated with each device) but also to be the optimal to present the output based on screen resolution. In such a case, a negative determination is made at diamond 304 and the logic may proceed to block 308. But before describing block 308, it is to be understood that should an affirmative determination be made at diamond 304, the logic instead moves to block 306 where the logic presents the output on the device undertaking the present logic.

Now in reference to block 308 as may be arrived at based on negative determination being made at diamond 304, at block 308 the logic determines at least one other device (e.g., indicated in a network map for a network on which the device is communicating, and/or e.g. communicating over a network with the first device to exchange information such as e.g. presence information and/or position information) capable of presenting the output based on the context of the user input and/or any inference derived therefrom in accordance with present principles, ephemeral information in accordance with present principles, and/or content-based data in accordance with present principles. Such determinations of device capability based on context (e.g. contextual inference), ephemeral information, and/or content based information may be made similar to respective determinations described above with respect to block 302 save e.g. being made for a device other than the device undertaking the present logic.

In addition to or in lieu of the foregoing, at block 308 it may be determined using eye tracking software (e.g. applied to one or more (e.g. real time or substantially real time) images of a user gathered by a camera e.g. on the first device) another device on which to present the content responsive to a determination that the user is looking at the other device (e.g. and/or at least not at the device undertaking the logic of FIG. 3). As an example, assume a user enters an audible command to a smart phone to "present last night's episode of Program ABC" while looking not at the smart phone but at a smart television in the room in which the user is disposed. A camera on the smart phone may gather at least one image of the user's eyes (e.g. and even more particularly the user's pupils) and then apply eye tracking software to the image to determine that the user is looking at the smart TV, and hence determine that a command from the smart phone to output Program ABC should be transmitted to the TV to present program ABC thereon rather than causing Program ABC to be presented on the smart phone itself. Thus, it is to be generally understood that a user's eye position, gaze, and/or focus while entering an audible command may be input to the device to indicate another device for which the user is commanding the device to present the content.

In any case, from block 308 the logic moves to block 310 where the logic determines the location of the second device e.g. relative to the first device and/or whether it is within a threshold (e.g. visible and/or visual) distance of the device undertaking the present logic and/or the user (e.g. based on signals from a camera). Determining the location of the second device and e.g. whether it is within a distance threshold may be done by e.g. applying GPS coordinates for the other device to a map for which the current device's GPS coordinates have also been applied to determine a distance between the two based on a map scaling factor. Still other ways of determining location may be used such as e.g. ascertaining the location of the other device based on a lookup table correlating other networked devices with coordinates for those other devices, based on merely receiving the GPS coordinates from the second device over the network, etc.

In any case, after block 310 the logic proceeds to decision diamond 312 where the logic determines whether the other device determined to be capable of presenting the output at block 308 is the nearest device physically to the device undertaking the present logic (e.g. based on locating the nearest device on a network map, and/or accessing and/or analyzing GPS coordinates for plural other (e.g. proximate) devices to determine which is closest to the device at which input is received based on GPS coordinates for the input-receiving device), and/or is on a list of (e.g. approved and/or capable) devices for presenting output as e.g. configured by a user. An affirmative determination at diamond 312 causes the logic to proceed to block 314 where the logic presents the output on the other (e.g. most proximate) device.

However, a negative determination at diamond 312 instead causes the logic to proceed to block 316. At block 316, the logic may determine another (e.g. third) device on which to present the output in accordance with present principles such as when e.g. the third device is closer/nearer to the device executing the logic of FIG. 3. Also at block 316 and where e.g. there is not a third device that is closer, the logic may nonetheless present the output on the second device at block 316, and/or may present a prompt on the device undertaking the logic of FIG. 3. The prompt may indicate that e.g. the user should provide input indicating a device on which to present the output, and/or may indicate that the output cannot be (e.g. currently) presented.

Accordingly, generally in reference to FIG. 3 and providing an example, assume that Lenovo has been collecting information about temperature, humidity, ambient light as well as other information, like file events, application events, etc. and entering such information into a data table and/or database accessible to the device undertaking the logic of FIG. 3. Also assume, e.g. the device of FIG. 3 determines a pattern that when ambient light conditions are relatively mild and/or low (e.g. beneath an ambient light level threshold), a particular person associated with the device of FIG. 3 generally likes to and/or does perform certain tasks on their tablet rather than their laptop or smart TV. In such an instance, the logic may determine to present output on the tablet responsive to receiving input at the user's laptop or smart TV.

Further discussing ambient light but doing so more generally, it is to be understood that ambient light may be taken into account by the device such that when determining where to stream output, the device may do so based on determining that the best conditions for viewing the output (e.g. the device being programmed for determining lower ambient light is more optimal than relatively higher ambient light for viewing content on a displays screen) is at a device in a location currently with the lowest ambient light rather than a device with a larger screen but that is current in a relatively bright location.

Figure 4:
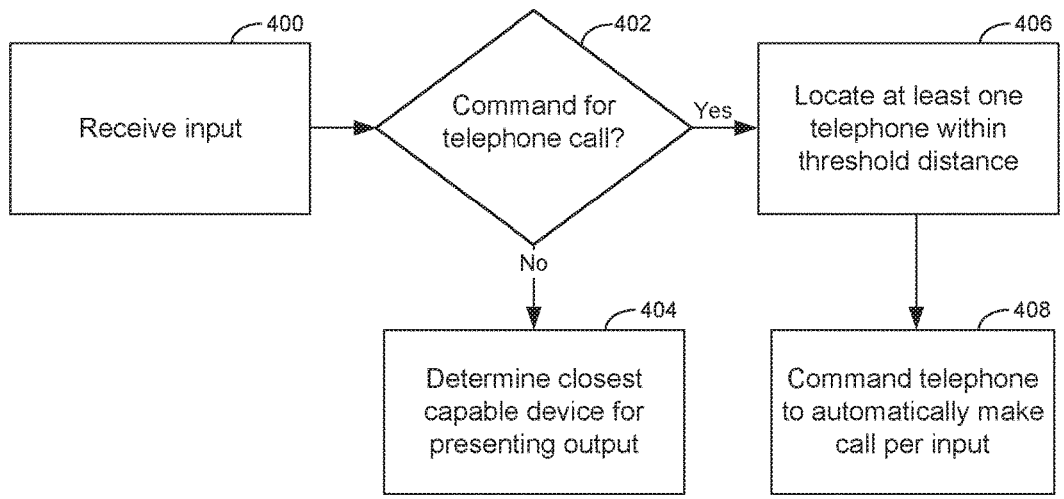

Continuing the detailed description in reference to FIG. 4, it shows exemplary logic to be executed by a device such as a system 100 for e.g. a particular use context and/or function, which in the present exemplary instance is a telephone call. The logic begins at block 400 where the logic receives input with a use context associated with a telephone call. The input may be an audible commands such as e.g. "Contact Steve," or "Dial Steve's cell phone." In any case, after block 400 the logic proceeds to decision diamond 402 where the logic determines in accordance with present principles whether the input pertains to a telephone call function. If a negative determination is made at diamond 402, the logic proceeds to block 404 where the logic determines another close and/or proximate device (e.g. and even the nearest of a plurality of devices) that is capable of presenting the output which does not involve initiating a telephone call. However, an affirmative determination at diamond 402 instead causes the logic to move to block 406 where the logic locates at least one device with telephone functionality e.g. within a threshold distance of the device undertaking the logic of FIG. 4 in accordance with present principles. The logic then moves to block 408, having located a telephone at block 406, where the logic commands the telephone to automatically without further user input initiate a call e.g. according to information providing in and/or with the input at block 400.

Figure 5:
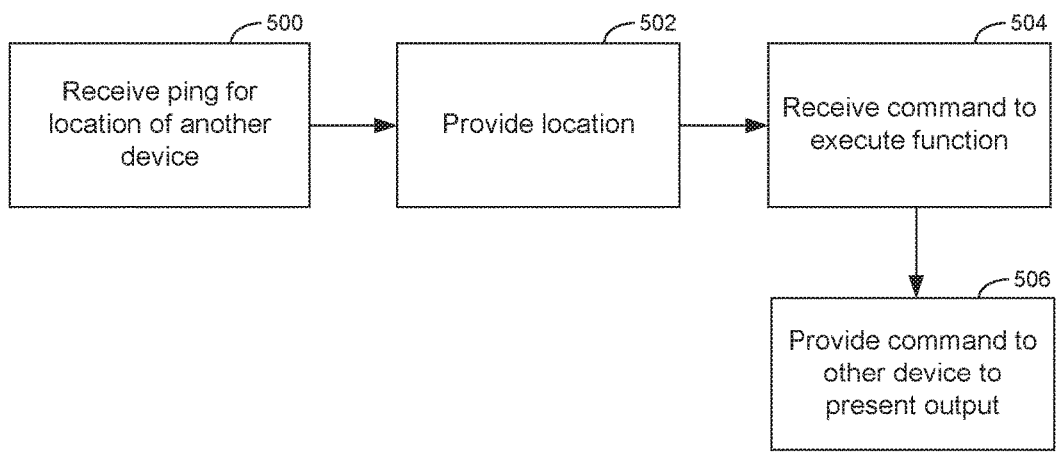
FIG. 5 is an example flowchart of logic to be executed by a server in accordance with present principles.

Before moving on to FIG. 5, it is to be understood that logic similar to FIG. 4 may be undertaken by a device for other use contexts and/or functions such as any of those described herein in accordance with present principles, such as e.g. a use context for AV content causing presentation AV content.

Now in reference to FIG. 5, it shows an example flowchart of logic to be executed by a server in accordance with present principles when e.g. a server facilitates communication between a device receiving input and a different device which is to present output associated with the input in accordance with present principles. The logic of FIG. 5 begins at block 500 where the logic receives a ping (e.g. a request signal) for location information for another device capable of presenting output associated with input received at the device pinging the server undertaking the present logic. The logic then proceeds to block 502 where the logic provides location information for another device back to the pinging device. Then at block 504 the logic receives from the pinging device a command to be transmitted to the output device to execute a function in accordance with present principles. The logic then concludes at block 506 where the logic provides and/or transmits the command to the other device for presentation of the output thereon.

Figure 6:
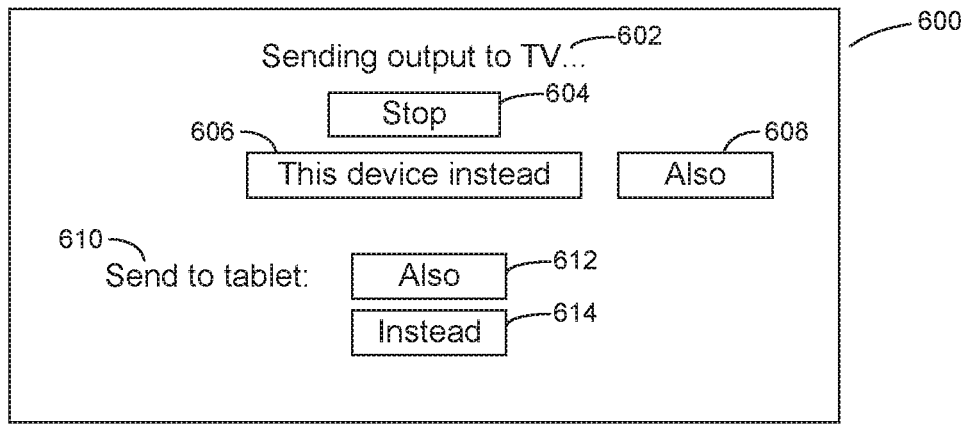
FIGS. 6-8 are example user interfaces (UIs) presentable on a device in accordance with present principles.
Figure 7:
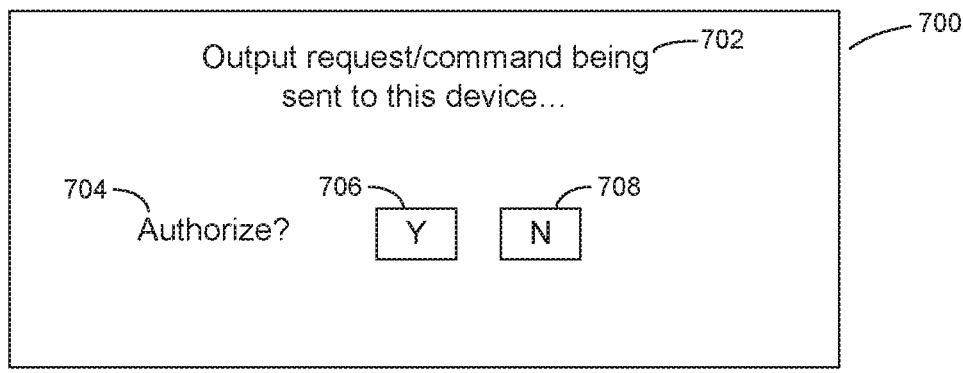
Figure 8:
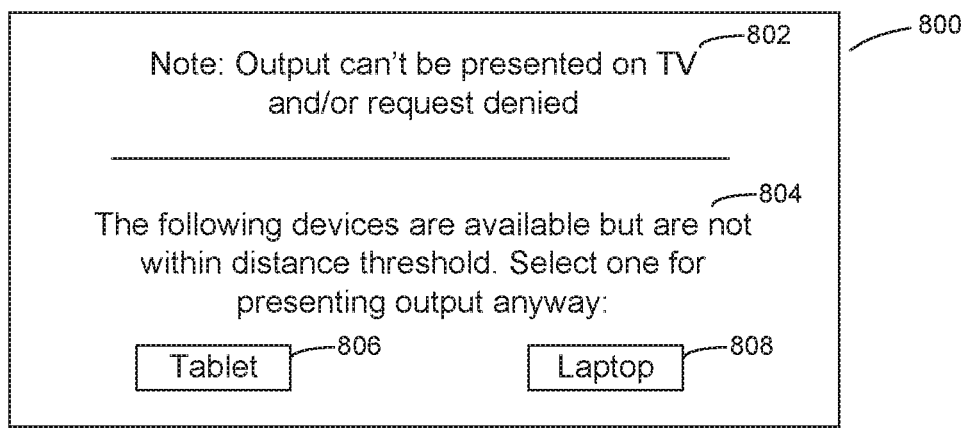

Reference is now made to FIGS. 6-8, which show various exemplary UIs presentable on a device such as the system 100 in accordance with present principles. Beginning first with FIG. 6, it shows an UI 600 presentable on a device receiving input in accordance with present principles. The UI 600 includes an indication 602 that information is currently being sent to another device for output thereon. The indication 602 may indicate the specific device to which the information is being sent, and may do so based on e.g. a device name assigned by the user prior to providing the input, and/or a device name indicated on a network map of devices communicating with the device presenting the UI 600.

A stop selector element 604 is also presented on the UI 600, which may be selectable to automatically without further user input responsive thereto to cease sending the information/command to the device which is to present the output. This device instead selector element 606 is also shown which may be selectable to automatically without further user input responsive thereto to present the output on the device presenting the UI 600 instead of the other device to which the command was being sent (e.g. in instances where the current device is capable of presenting the output). Additionally, an also selector element 608 is shown which may be selectable to automatically without further user input responsive thereto to configure the device presenting the UI 600 to present the output in addition to sending the information to the other device (e.g., in the present instance a TV) for presentation of the output thereon.

Concluding the description of FIG. 6, an alternative device indication 610 is also shown corresponding to yet another device besides the device presenting the UI 600 and the TV on which the output has been determined to be capable of being presented. Accordingly, an also selector element 612 is shown which may be selectable to automatically without further user input responsive thereto configure the device presenting the UI 600 to present the output on the tablet in addition to sending the information to TV for presentation of the output thereon. An instead selector element 614 is also shown which may be selectable to automatically without further user input responsive thereto present the output on the tablet instead of the TV.

Now in reference to FIG. 7, it shows an exemplary UI 700 presentable on a device receiving a command to present output (e.g. present AV content) corresponding to input received at another device in accordance with present principles. The UI 700 thus includes an indication 702 that an output request and/or command is being received and/or sent to the device presenting the UI 700. A prompt 704 is also shown for whether to authorize presentation of the output (e.g. in instances where the receiving device may authorize presentation prior to actually presenting received output). Accordingly, a yes selector element 706 and a no selector element 708 for respectively responding in the affirmative or negative to the prompt 704 are included on the UI 700 to respectively authorize or deny presentation of the output on the device of FIG. 7.

Turning to FIG. 8, it shows an exemplary UI 800 presentable on a device to which input is provided in accordance with present principles. The UI 800 includes an indication 802 that output corresponding to the input cannot be presented on a TV (e.g. and may further indicate a reason such as the TV being capable but outside a threshold distance). The indication 802 may also indicate that the request to the TV has been denied (e.g. at the TV, by selection of a selector element such as the element 708 described above).

The UI 800 may also include another indication 804 that other devices are available for presenting the content, and/or that other devices are available for presenting the content but are not within the distance threshold. The indication 804 may thus indicate that a device may be selected for presenting the output anyway (e.g. and may even provide the location of the other device so that a person may locate it and/or go to it for observing the output). Accordingly, a first selector element 806 for a tablet is shown that may be selectable to cause the device to command a tablet on the device's network to present the output automatically without further user input responsive thereto, as well as a second selector element 806 for a laptop that may be selectable to cause the device to command the laptop on the device's network to present the output automatically without further user input responsive thereto.

Without reference to any particular figure, it is to be understood that in addition to output requests and/or commands being communicated between devices over e.g. a WiFi network, such information (e.g. including device location and/or proximity information) may be (e.g. detected and) provided through still other means such as e.g. using near field communication (NFC), Bluetooth communication, etc.

Also without reference to any particular figure, it is to be understood that input other than audible input may be used to cause output to be presented on a different device in accordance with present principles. For instance, gestures in free space may be detected by a gesture sensor such as the sensor 198 described above for a user to enter commands and/or input to a device in accordance with present principles. As another example, input may be provided using a keyboard and/or mouse, eye recognition, and/or facial expression.

Still without reference to any particular figure, it may now be appreciated that present principles may use context and/or function type to determine where and how to deliver the output for a request. Criteria used may be e.g. device capability, contextual inference, correlated ephemeral data, and/or content-based data.

Providing a few additional examples, in a first example a user may provide audible input to a laptop or tablet computer to "call Bill," but a cell phone next to the laptop or tablet (e.g. within a threshold distance from the laptop of tablet such as one foot) initiates the call.

As another example, a person may provide audible input to a first device to "Play 'At Home' playlist," and the assistant determines that the person entering the request is at their personal residence, and more particularly on the back porch of the residence, and hence the first device causes songs from the "At Home" playlist to be presented on outdoor speakers juxtaposed around the porch. In such an instance, the first device may make the determination to present the songs from the playlist on the back porch speakers based on e.g. proximity information, temperature information (e.g. that temperature is within a predefined range at which a user may find the outside temperature to be comfortable), humidity information (e.g. that humidity is within a predefined range at which a user may find the outside humidity to be comfortable), location information, ambient light characteristics and/or information, etc. to determine the best device (in this case, the back porch speakers) on which to present the songs.

As still another example, a user may provide input on their PC to "remind me to call Jennifer on the way home." On the user's way home (e.g. as determined by the user's cell phone calculating possible destinations while moving based on a history of previous destinations that are currently being approached), however, the user's PC is suspended/not in use, and thus the cell phone notifies the user of the reminder for which the user provided input (e.g. based on the input being uploaded from the PC to cloud storage accessible to the cell phone for such purposes). Likewise, if the user is at home, the TV may provide the reminder (e.g., based on facial recognition software being applied to at least one image of the user gathered by a camera on the TV to determine that the user is present to view the reminder).

As yet another example (e.g. for ephemeral data), a user may provide input to a digital assistant on a smart phone asking, "Who is that actor?" Then, the smart phone and/or a TV on which an AV program including the actor is being presented may make a determination using eye tracking software in accordance with present principles where on the TV's display the user is looking to thereby determine the actor being looked at and hence to which the user's input is directed. The smart phone may then determine whom the actor is and cause actor information for the actor to be presented automatically on the TV without further user input. Determining whom the actor on screen is may be done a number of ways, including e.g. parsing metadata associated with the AV program, and/or facial recognition software being applied to an image of the actor from the AV content (e.g., using at least one frame from the AV content) to identify the actor, and/or by determining the location and/or current scene of the AV content, and also e.g. providing input to a search engine including information regarding the actor from the scene at which the user's attention is directed. Moreover, the ephemeral data from the TV may be used to decipher the meaning of the question based on an initial recognition that the TV is powered on.

Before concluding the detailed description, it is to be understood that although e.g. an audible input application, a gesture recognition application, eye tracking software, etc. and still other features described above in accordance with present principles may be vended with a device, present principles apply in instances where one or more of the foregoing may be e.g. downloaded from a server to a device over a network such as the Internet.

While the particular DEVICES AND METHODS TO RECEIVE INPUT AT A FIRST DEVICE AND PRESENT OUTPUT IN RESPONSE ON A SECOND DEVICE DIFFERENT FROM THE FIRST DEVICE is herein shown and described in detail, it is to be understood that the subject matter which is encompassed by the present application is limited only by the claims.

What is claimed is:

1. A device, comprising:
   at least one processor; and
   storage accessible to the at least one processor and bearing instructions executable by the at least one processor to:
   receive user input requesting an output;
   determine a first apparatus on which to present the output at least in part based on a determination that the first apparatus is a nearest apparatus to the device physically;
   present the output on the first apparatus; and
   present a prompt on the device, the prompt requesting user input that indicates at least one other apparatus on which to present the output, the prompt being presented responsive to a determination that the output cannot be presented on the first apparatus.

2. The device of claim 1, wherein the determining the first apparatus on which to present the output is at least in part based on a determination that the first apparatus is a nearest apparatus to the device physically of a plurality of apparatuses.

3. The device of claim 1, wherein the instructions are executable by the at least one processor to:
   determine the first apparatus on which to present the output at least in part based on a determination that the first apparatus is a nearest apparatus physically as determined based on information indicated in a network map accessible to the device.

4. The device of claim 1, wherein the instructions are executable by the at least one processor to:
 determine the first apparatus on which to present the output is at least in part based on a determination that the first apparatus is a nearest apparatus physically as determined based on information received from a position sensor on the first apparatus.

5. The device of claim 4, wherein the information comprises GPS coordinates.

6. The device of claim 1, comprising a display accessible to the device, wherein the prompt is presented on the display, and wherein the prompt comprises one or more selectors respectively associated with different apparatuses on which the output is presentable, the one or more selectors each being selectable to provide a command to the device to present the output on the respectively associated apparatus.

7. The device of claim 1, wherein
 the prompt indicates that the output cannot be presented on the first apparatus.

8. The device of claim 1, wherein the output comprises at least one of: audio content, video content.

9. A method, comprising:
 receiving, at a device, user input requesting an output;
 determining a first apparatus on which to present the output at least in part based on a determination that the first apparatus is a nearest apparatus to the device physically; and
 presenting a prompt on a display accessible to the device, the prompt requesting user input that indicates at least one other apparatus on which to present the output, the prompt comprising one or more selectors respectively associated with different apparatuses on which the output is presentable, the one or more selectors each being selectable to provide a command to the device to present the output on the respectively associated apparatus.

10. The method of claim 9, wherein the determining the first apparatus on which to present the output is at least in part based on a determination that the first apparatus is a nearest apparatus to the device physically of a plurality of apparatuses.

11. The method of claim 9, comprising:
 determining the first apparatus on which to present the output at least in part based on a determination that the first apparatus is a nearest apparatus physically as determined based on information indicated in a network map accessible to the device.

12. The method of claim 9, comprising:
 determining the first apparatus on which to present the output is at least in part based on a determination that the first apparatus is a nearest apparatus physically as determined based on information received from a position sensor on the first apparatus.

13. A computer readable storage medium (CRSM) that is not a transitory signal, the computer readable storage medium comprising instructions executable by at least one processor to:
 receive, at a device, user input requesting an output;
 determine a first apparatus on which to present the output at least in part based on a determination that the first apparatus is a nearest apparatus to the device physically; and
 present a prompt on a display accessible to the at least one processor, the prompt requesting user input that indicates at least one other apparatus on which to present the output, the prompt comprising one or more selectors respectively associated with different apparatuses on which the output is presentable, the one or more selectors each being selectable to provide a command to the device to present the output on the respectively associated apparatus.

14. The CRSM of claim 13, wherein the determining the first apparatus on which to present the output is at least in part based on a determination that the first apparatus is a nearest apparatus to the device physically of a plurality of apparatuses.

15. The CRSM of claim 13, wherein
 the prompt indicates that the output cannot be presented on the first apparatus.

16. The method of claim 9, wherein the prompt indicates that the output cannot be presented on the first apparatus.

17. The method of claim 9, wherein the output comprises at least one of: audio content, video content.

18. The CRSM of claim 13, wherein the output comprises at least one of: audio content, video content.

19. The CRSM of claim 13, wherein the instructions are executable by the at least one processor to:
 determine the first apparatus on which to present the output at least in part based on a determination that the first apparatus is a nearest apparatus physically as determined based on information indicated in a network map accessible to the at least one processor.

20. The CRSM of claim 13, wherein the instructions are executable by the at least one processor to:
 determine the first apparatus on which to present the output is at least in part based on a determination that the first apparatus is a nearest apparatus physically as determined based on information received from a position sensor on the first apparatus.

* * * * *